US006758195B1

United States Patent
Jaye

(10) Patent No.: US 6,758,195 B1
(45) Date of Patent: Jul. 6, 2004

(54) SYSTEM AND METHOD FOR FAST EXHAUST GAS RECIRCULATION IN A COMBUSTION CHAMBER

(75) Inventor: John R Jaye, Northville, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/304,361

(22) Filed: Nov. 26, 2002

(51) Int. Cl.[7] ............................................. F02M 25/07
(52) U.S. Cl. .............................. 123/568.13; 123/568.21
(58) Field of Search ...................... 123/568.11, 568.13, 123/568.14, 568.21, 568.23, 308, 432, 302, 568.2, 58.8, 315

(56) References Cited

U.S. PATENT DOCUMENTS

| | | | | |
|---|---|---|---|---|
| 4,109,625 A | * | 8/1978 | Kawamura et al. ..... | 123/568.13 |
| 4,156,414 A | * | 5/1979 | Kawamura et al. ...... | 123/568.2 |
| 5,203,310 A | * | 4/1993 | Gatellier ................. | 123/568.13 |
| 5,351,668 A | * | 10/1994 | Gatellier ................. | 123/568.13 |
| 5,782,226 A | * | 7/1998 | Gartner .................. | 123/568.13 |
| 6,178,933 B1 | * | 1/2001 | Lavy ...................... | 123/568.13 |
| 6,386,154 B1 | * | 5/2002 | Hellman et al. ......... | 123/568.13 |
| 2002/0129798 A1 | * | 9/2002 | Urushihara et al. ..... | 123/568.13 |

* cited by examiner

Primary Examiner—Willis R. Wolfe
(74) Attorney, Agent, or Firm—Thomas A. Jurecko

(57) ABSTRACT

An exhaust gas recirculation system includes a combustion chamber having at least one intake port in communication with the combustion chamber and a corresponding intake valve for controlling a flow through the intake port into the combustion chamber. The combustion chamber also has at least one exhaust port in communication with the combustion chamber and a corresponding exhaust valve for controlling a flow through the exhaust port from the combustion chamber. In addition, the combustion chamber has at least one exhaust gas recirculation port in communication with the combustion chamber and with the exhaust port external or adjacent to the combustion chamber. The exhaust gas recirculation port has a corresponding exhaust gas recirculation valve for controlling a flow through the exhaust gas recirculation port into the combustion chamber. The exhaust gas recirculation valve may be separately actuatable from the intake valve and the exhaust valve.

6 Claims, 3 Drawing Sheets

SYSTEM AND METHOD FOR FAST EXHAUST GAS RECIRCULATION IN A COMBUSTION CHAMBER

FIELD OF THE INVENTION

The present invention relates to a combustion chamber. More specifically, the present invention relates to a system and method for achieving fast exhaust gas recirculation in a combustion chamber.

BACKGROUND INFORMATION

Conventional spark-ignited internal combustion engines employ a combustion chamber into which fuel is directed and ignited. In order to reduce the fuel consumption of the engine, exhaust gas recirculation may be used. Exhaust gas recirculation may also be used in an engine to reduce nitrous oxide ($NO_x$) and hydrocarbon emissions.

One example of an exhaust gas recirculation system, such as that shown and described in U.S. Pat. No. 5,894,826, include an internal combustion engine defining a combustion chamber for the direct injection of fuel through a centrally located fuel injector. The combustion chamber has a first inlet passage and port for directing hot exhaust gases of a recirculation medium to a central region of the combustion chamber. The combustion chamber also has a second inlet passage and port for directing air tangentially into the combustion chamber to cause a circular flow about the chamber's periphery and about the exhaust rich central region. The injector sprays fuel through the hot exhaust gas medium in the central region which results in a pre-heating of the fuel, thereby reducing hydrocarbon emissions prior to ignition by a spark plug located adjacent the periphery of the combustion chamber.

Several problems exist with conventional exhaust gas recirculation systems. For instance, conventional exhaust gas recirculation systems typically use exhaust gas from the motor vehicle's exhaust manifold. However, the exhaust manifold is usually located at a significant distance, e.g., about 15 inches, from the combustion chambers. Because of this large distance, recirculated exhaust gas is typically not available, or else too much is available, for use in the combustion chamber for a fairly significant amount of time. In addition, it is often difficult to evenly distribute the exhaust gas between the various combustion chambers that are operating in the engine. Still further, since exhaust gas exhibits transient behavior, the amount of exhaust gas that can be used is often limited.

Thus, there is a need to provide an exhaust gas recirculation system and method that achieves fast exhaust gas recirculation in a combustion chamber.

It is therefore an object of the present invention to provide an exhaust gas recirculation system and method that increases the speed with which exhaust gas recirculation may be employed in a combustion chamber.

It is also an object of the present invention to provide an exhaust gas recirculation system and method that improves the fuel economy of an engine.

It is another object of the present invention to provide a system and method that provides more equal distribution of recirculated exhaust gas to combustion chambers.

SUMMARY OF THE INVENTION

The above and other beneficial objects of the present invention are achieved by providing a system and method as described herein. The present invention, according to one example embodiment thereof, relates to an exhaust gas recirculation system that includes a combustion chamber having at least one intake port in communication with the combustion chamber. The intake port has a corresponding intake valve for controlling a flow through the intake port into the combustion chamber. The combustion chamber also has at least one exhaust port in communication with the combustion chamber. The exhaust port has a corresponding exhaust valve for controlling a flow through the exhaust port from the combustion chamber.

In addition, the combustion chamber has at least one exhaust gas recirculation port in communication with the combustion chamber. The exhaust gas recirculation port may also be in communication with the exhaust port external to the combustion chamber. The exhaust gas recirculation port may have a corresponding exhaust gas recirculation valve for controlling a flow through the exhaust gas recirculation port into the combustion chamber. The exhaust gas recirculation valve is separately actuatable from the intake valve and the exhaust valve. The exhaust gas recirculation valve may be actuatable according to at least one engine operating condition, such as the engine load, determinable from an engine operating condition sensor. In addition, the exhaust gas recirculation system may include a controller that is configured to control the operation of the exhaust gas recirculation valve.

DETAILED DESCRIPTION

Figure 1:
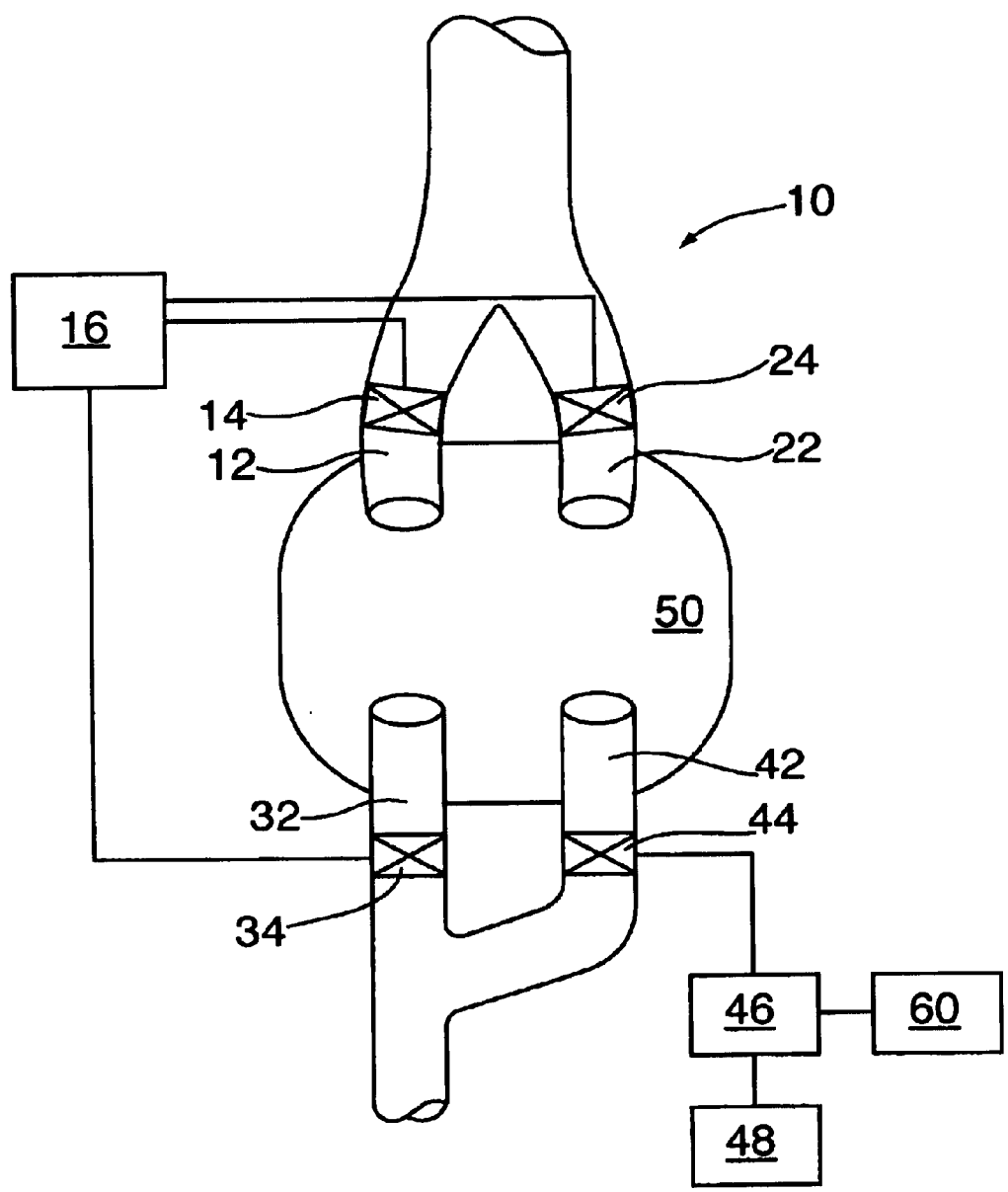
FIG. 1 illustrates schematically an exhaust gas recirculation system, in accordance with one example embodiment of the present invention.

FIG. 1 illustrates schematically an exhaust gas recirculation system 10, in accordance with one example embodiment of the present invention. In the example embodiment shown, a combustion chamber 50 is provided. The combustion chamber 50 may be the cylinder bore of an engine block in which a piston is mounted for reciprocation therein, as is common with internal combustion engines.

FIG. 1 shows the combustion chamber 50 having various inlet and exhaust ports. For instance, FIG. 1 illustrates that exhaust gas recirculation system 10 includes a first intake port 12 that is in fluid communication with the combustion chamber 50. The first intake port 12 has a corresponding first intake valve 14 that controls the flow through the first intake port 12 into the combustion chamber 50. The first intake valve 14 is positioned externally to the combustion chamber 50.

In addition, FIG. 1 illustrates that the exhaust gas recirculation system 10 includes a second intake port 22 that is in fluid communication with the combustion chamber 50. The second intake port 22 has a corresponding second intake valve 24 that controls the flow through the second intake port 22 into the combustion chamber 50. The second intake valve 24 is positioned externally to the combustion chamber 50. It is noted that, while FIG. 1 illustrates both a first intake port 12 and a second intake port 22, it should be understood that, in accordance with other example embodiments of the present invention, a single intake port (and corresponding intake valve) may be provided by the exhaust gas recirculation system 10. Alternatively, more than two intake ports may be provided by the exhaust gas recirculation system 10.

In addition, FIG. 1 illustrates that the exhaust gas recirculation system 10 includes an exhaust port 32 in fluid communication with the combustion chamber 50. The exhaust port 32 has a corresponding exhaust valve 34 for controlling a flow of exhaust gas through the exhaust port 32 from the combustion chamber 10. The exhaust valve 34 is positioned externally to the combustion chamber 50. It is noted that, while FIG. 1 illustrates a single exhaust port 32, it should be understood that, in accordance with other example embodiments of the present invention, more than one exhaust port (and corresponding exhaust valve) may be provided by the exhaust gas recirculation system 10.

In addition, FIG. 1 illustrates that the exhaust gas recirculation system 10 includes an exhaust gas recirculation port 42 in communication with the combustion chamber 50. In the example embodiment shown, the exhaust gas recirculation port 42 has a corresponding exhaust gas recirculation valve 44 for controlling a flow of recirculated exhaust gas through the exhaust gas recirculation port 42 into the combustion chamber 50. In addition, and as shown in FIG. 1, the exhaust gas recirculation port 42 may also be in communication with the exhaust port 42 external to and, e.g., immediately adjacent to, the combustion chamber 50.

FIG. 1 also illustrates schematically a first actuator 16 and a second actuator 46. The first actuator 16 is coupled to the first intake valve 14, the second intake valve 24 and the exhaust valve 34. The first intake valve 14, the second intake valve 24 and the exhaust valve 34 are configured to be actuated by the first actuator 16 in accordance with a first predetermined control arrangement. Typically, in a conventional internal combustion engine, the first actuator may be a camshaft or camshafts that controls the timing of the opening and closing of the first intake valve 14, the second intake valve 24 and the exhaust valve 34.

In addition, FIG. 1 illustrates a second actuator 46. The second actuator 46 is coupled to the exhaust gas recirculation valve 44 thus enabling the exhaust gas recirculation valve 44 to be separately actuatable from the intake valves 14, 24 and exhaust valve 34. The exhaust gas recirculation valve 44 is configured to be actuated by the second actuator 46 in accordance with a second predetermined control arrangement. This second predetermined control arrangement may include any program that controls the timing of the opening and closing of the exhaust gas recirculation valve 44. An example embodiment of the present invention, the second predetermined control arrangement at least partially depends on the operating conditions of the engine.

According to various different example embodiments of the present invention, the engine operating conditions on which the second predetermined control arrangement is at least partially dependent may include the engine load. These engine operating conditions may be determined via an engine operating condition sensor, such as the engine operating condition sensor 48 illustrated in FIG. 1, or by any other engine operating condition determination arrangement. In the example embodiment shown in FIG. 1, the engine operating condition sensor 48 may be configured to provide a signal to the exhaust gas recirculation valve 44 that is indicative of the engine operating condition.

According to this example embodiment, the second actuator 46 is configured to receive a signal from the engine operating condition sensor 48 and to operate the exhaust gas recirculation valve 44 in accordance therewith. For instance, if the second actuator 46 receives a signal from the engine operating condition sensor 48 indicating a first engine operating condition, the second actuator 46 may be configured to open the exhaust gas recirculation valve 44. If the second actuator 46 receives a signal from the engine operating condition sensor 48 indicating a second engine operating condition, the second actuator 46 may be configured to close the exhaust gas recirculation valve 44. The engine operating condition sensor 48 may be configured to determine that the engine is idling and to signal the second actuator 46 to close the exhaust gas recirculation valve 44 in response thereto. In addition, the engine operating condition sensor 48 may be configured to determine that the engine is being operating in a wide-open-throttle condition and to signal the second actuator 46 to close the exhaust gas recirculation valve 44 in response thereto. Furthermore, the engine operating condition sensor 48 may be configured to determine that the engine is being operated in a condition between idling and wide-open-throttle and to signal the second actuator 46 to open the exhaust gas recirculation valve 44 in response thereto.

According to one example embodiment, the second actuator 46 is configured to operate the exhaust gas recirculation valve 44 in accordance with a predetermined lift profile, which may depend on such factors as, e.g., the size of the exhaust gas recirculation valve 44, the lift duration of the exhaust gas recirculation valve 44, etc. Alternately, the second actuator 46 may be controlled by a separate controller 60, in accordance with a predetermined lift profile stored in the controller 60. In this manner, the exhaust gas recirculation valve 44 may supply the optimum quantity of recirculated exhaust gas to the combustion chamber 50 via the exhaust gas recirculation port 42, at the optimal time and for the optimal duration.

Figure 2:
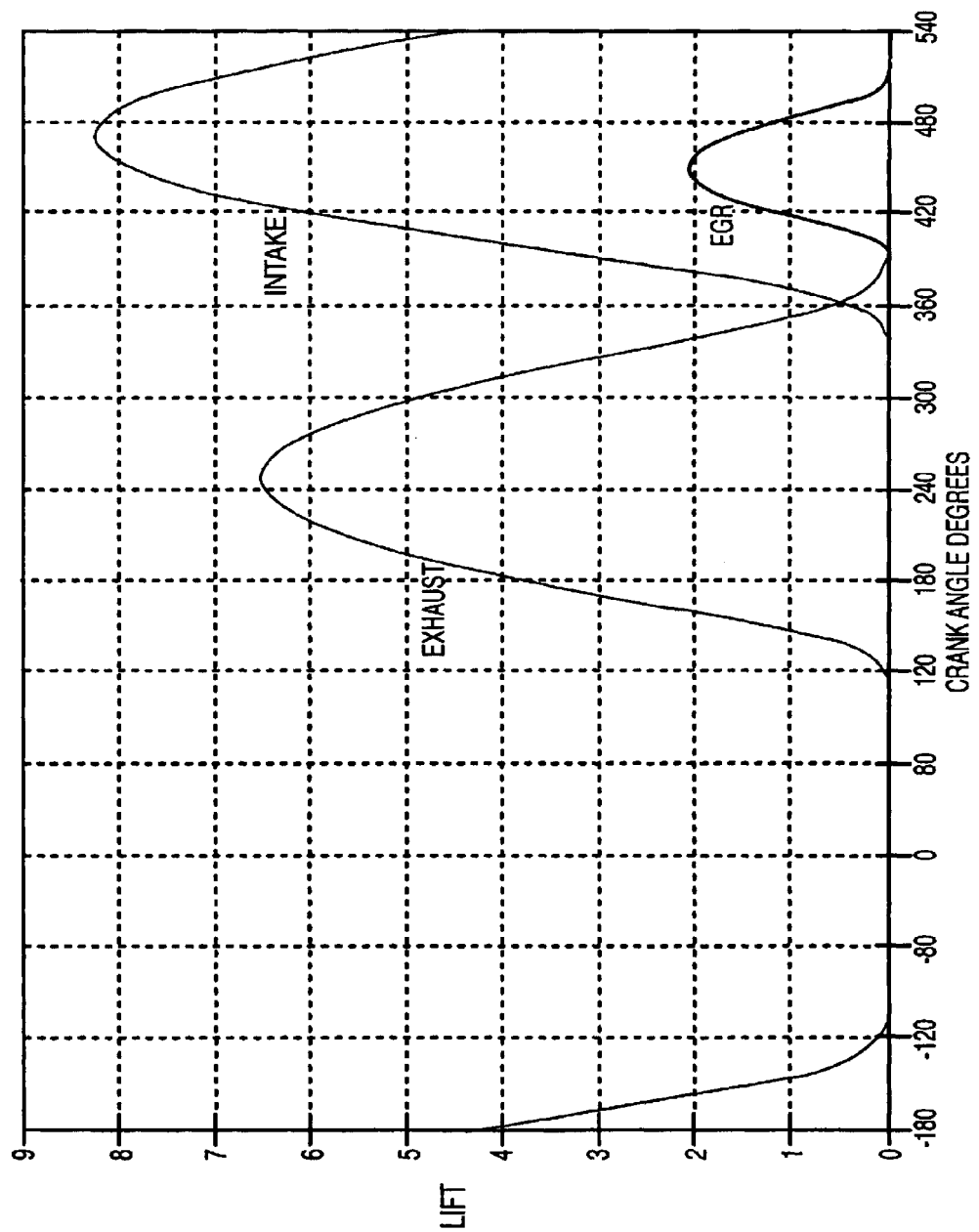
FIG. 2 is a diagram that illustrates a lift profile of the intake, exhaust and exhaust gas recirculation valves, in accordance with one example embodiment of the present invention.

FIG. 2 is a diagram that illustrates the timing and duration that each of the intake valves 14, 24 exhaust valves 34 and exhaust gas recirculation valves may be actuated, e.g., also referred to as a lift profile, in accordance with one example embodiment of the present invention. Specifically, FIG. 2 illustrates the lift profile of each of the valves over the course of several engine revolutions, measured in crank angle degrees. In the example embodiment shown, the exhaust valve 34 is caused to be lifted between approximately 120 crank angle degrees and 360 crank angle degrees, and achieves a maximum lift of 6.5 at approximately 240 crank angle degrees. In addition, the intake valves 14, 24 are caused to be lifted between approximately 360 crank angle degrees and 600 crank angle degrees, and achieves a maximum lift of 8.2 at approximately 470 crank angle degrees. In the example embodiment shown, the exhaust gas recirculation valve 44 is caused to be lifted between approximately 390 crank angle degrees and 510 crank angle degrees, and achieves a maximum lift of 2.0 at approximately 450 crank angle degrees.

Thus, the present invention, in accordance with various example embodiments thereof, may provide certain advantages over conventional exhaust gas recirculation systems. For instance, the exhaust gas recirculation system 10 of the present invention may provide faster response times to introduce the recirculated exhaust gas to the combustion chamber 50, as compared to conventional exhaust gas recirculation systems. For instance, conventional exhaust gas recirculation systems require the exhaust gas of the combustion chamber to be recirculated from an exhaust manifold located a significant distance from the combustion chamber 50. Because of this distance, conventional exhaust gas recirculation systems require a significant amount of time before recirculated exhaust gas is provided to the combustion chamber. In contrast, the exhaust gas recirculation system 10 of the present invention, by providing an exhaust gas recirculation port into the combustion chamber that is in fluid communication with the exhaust port of the combustion chamber, may require very little time to introduce recirculated exhaust gas into the combustion chamber 50. The exhaust gas recirculation system 10 of the present invention may be configured to provide the recirculated exhaust gas to the combustion chamber within a single engine revolution.

Furthermore, the exhaust gas recirculation system 10 of the present invention may provide a more equal distribution of recirculated exhaust gas to the combustion chambers of the engine. For instance, the exhaust gas recirculation port 42 into the combustion chamber 50 may be in fluid communication with, e.g., immediately adjacent to the combustion chamber 50, the exhaust port of the combustion chamber, thereby ensuring a substantial supply of exhaust gas to each combustion chamber of the engine. In addition, the exhaust gas recirculation valve 44 may be separately actuated from the intake and exhaust valves of the combustion chamber, thereby ensuring that the supply of exhaust gas is supplied to each combustion chamber 50 of the engine at the right time.

Figure 3:
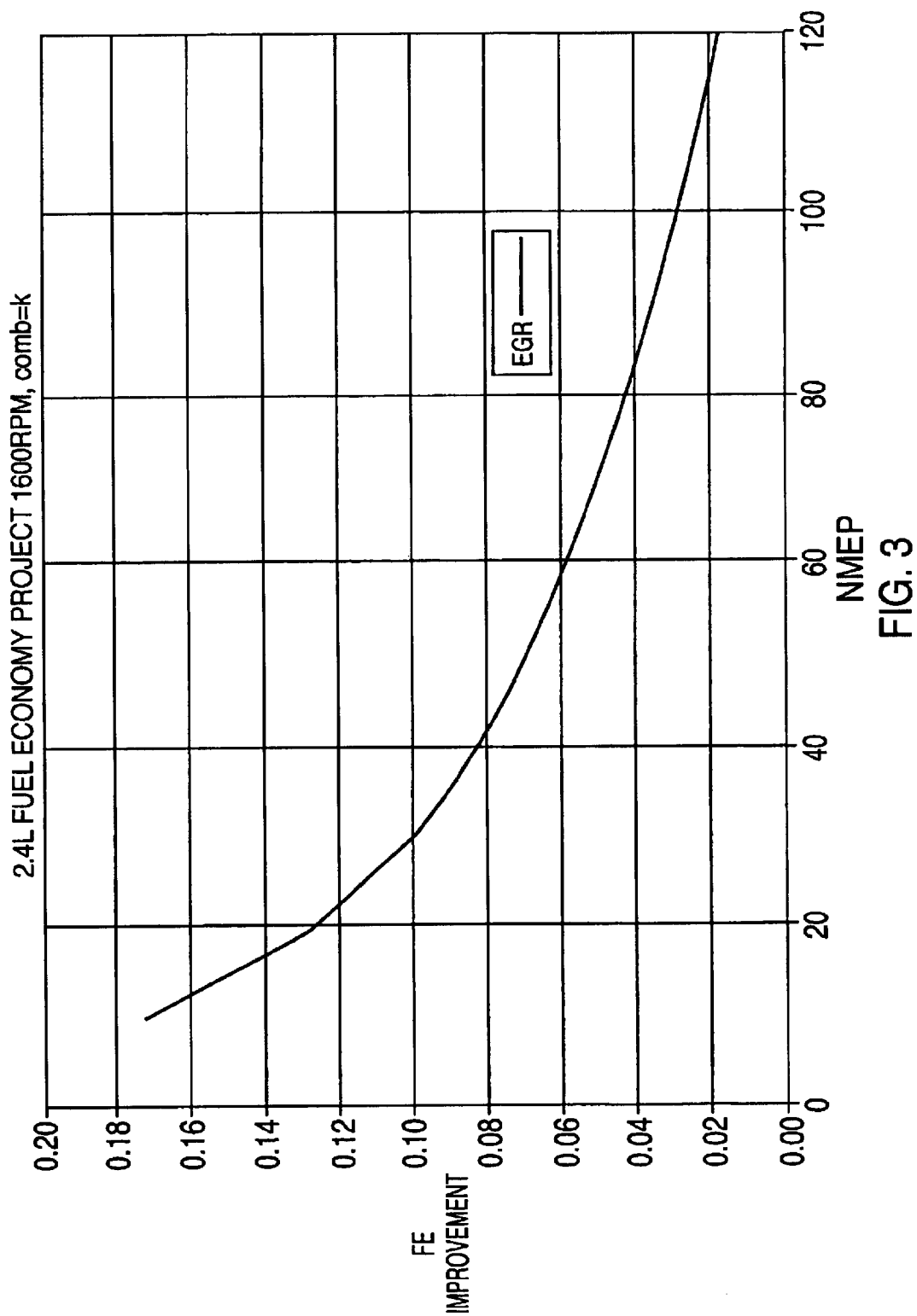
FIG. 3 is a graph that illustrates the results of a computer simulation for determining the improvement in fuel economy achieved by the exhaust gas recirculation system as compared to an engine having a conventional exhaust gas recirculation system, in accordance with one example embodiment of the present invention.

Furthermore, the exhaust gas recirculation system 10 of the present invention may provide improved fuel economy as compared to conventional exhaust gas recirculation systems. The use of recirculated exhaust gas may reduce the quantity of fresh air required by the engine, thereby reducing the amount of work that the engine is required to perform in order to supply the fresh air. In addition, the use of recirculated exhaust gas enables the preheating of fuel entering into the combustion chamber. For instance, FIG. 3 is a graph that illustrates the results of a computer simulation with respect to a four-cylinder engine. Specifically, the graph of FIG. 3 illustrates the improvements in fuel economy of a four-cylinder engine having the exhaust gas recirculation system 10 of the present invention, as compared to an engine having a conventional exhaust gas recirculation system. In FIG. 3, the x-axis denotes the engine load, while the y-axis denotes the relative improvement in fuel economy, in decimal form, achieved by the exhaust gas recirculation system 10. Thus, as shown in FIG. 3, at low engine loads, e.g., approximately 10%, the exhaust gas recirculation system 10 provides an improvement in fuel economy of approximately 0.17 or 17%. The relative improvement in fuel economy gradually lowers at higher engine loads.

Thus, the several aforementioned objects and advantages of the present invention are most effectively attained. Those skilled in the art will appreciate that numerous modifications of the exemplary embodiments described hereinabove may be made without departing from the spirit and scope of the invention. Although various exemplary embodiments of the present invention have been described and disclosed in detail herein, it should be understood that this invention is in no sense limited thereby and that its scope is to be determined by that of the appended claims.

What is claimed is:

1. An exhaust gas recirculation system comprising:
   at least one intake port in communication with a combustion chamber, the at least one intake port having a corresponding intake valve arranged to control a flow through the at least one intake port into the combustion chamber;
   at least one exhaust port in communication with the combustion chamber, the at least one exhaust port having a corresponding exhaust valve arranged to control a flow through the at least one exhaust port from the combustion chamber;
   at least one exhaust gas recirculation port in communication with the combustion chamber and further in communication with the at least one exhaust port external to the combustion chamber, the at least one exhaust gas recirculation port having a corresponding exhaust gas recirculation valve arranged to control a flow through the at least one exhaust gas recirculation port into the combustion chamber; and
   wherein the exhaust gas recirculation valve is coupled to a second actuator and is configured to be separately actuatable from the intake valve and the exhaust valve, the second actuator is coupled to an engine operating condition sensor, the engine operating condition sensor is configured to sense one of the engine operating at an idle condition and the operating at a wide-open-throttle condition and, in response to provide a signal to the second actuator to close the exhaust gas recirculation valve.

2. The system of claim 1, wherein the at least one exhaust gas recirculation port is in communication with the at least one exhaust port external to the combustion chamber.

3. The system of claim 2, wherein the at least one exhaust gas recirculation port is in communication with the at least one exhaust port adjacent to the combustion chamber.

4. An exhaust gas recirculation system comprising:
   at least one intake port in communication with a combustion chamber, the at least one intake port having a corresponding intake valve arranged to control a flow through the at least one intake port into the combustion chamber;
   at least one exhaust port in communication with the combustion chamber, the at least one exhaust port having a corresponding exhaust valve arranged to control a flow through the at least one exhaust port from the combustion chamber;
   at least one exhaust gas recirculation port in communication with the combustion chamber and further in communication with the at least one exhaust port external to the combustion chamber, the at least one exhaust gas recirculation port having a corresponding exhaust gas recirculation valve arranged to control a flow through the at least one exhaust gas recirculation port into the combustion chamber; and
   wherein the exhaust gas recirculation valve is coupled to a second actuator, the second actuator is coupled to a engine operating condition sensor, the engine operating condition sensor is configured to sense one of the engine operating at an idle condition and a wide-open-throttle condition and, in response, to provide a signal to the second actuator to close the exhaust gas recirculation valve.

5. The system of claim 4, further comprising a controller coupled to the second actuator and configured to control the operation of the second actuator.

6. The system of claim 4, wherein the at least one exhaust gas recirculation port is in communication with the at least one exhaust port adjacent to the combustion chamber.

* * * * *